United States Patent
Valdez

(10) Patent No.: US 8,184,791 B2
(45) Date of Patent: May 22, 2012

(54) METHOD AND SYSTEM FOR COMPENSATING AUDIO SIGNALS DURING A COMMUNICATION SESSION

(75) Inventor: John P. Valdez, Flower Mound, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 435 days.

(21) Appl. No.: 12/414,102

(22) Filed: Mar. 30, 2009

(65) Prior Publication Data

US 2010/0246802 A1 Sep. 30, 2010

(51) Int. Cl.
*H04M 3/42* (2006.01)

(52) U.S. Cl. ................................................. 379/202.01

(58) Field of Classification Search .............. 379/202.01
See application file for complete search history.

(56) References Cited

U.S. PATENT DOCUMENTS

| | | | |
|---|---|---|---|
| 4,130,739 A * | 12/1978 | Patten | 369/47.36 |
| 2002/0152066 A1* | 10/2002 | Piket | 704/226 |
| 2004/0058674 A1* | 3/2004 | Yoakum | 455/416 |
| 2005/0076081 A1* | 4/2005 | Rui et al. | 709/204 |

* cited by examiner

*Primary Examiner* — Alexander Jamal

(57) ABSTRACT

An approach is provided for compensating audio signals during a communication session by receiving audio signals from parties to the communication session, sampling the audio signals to determine signal level and noise floor, and compensating the audio signals to bring each signal to approximately an equal level based on the determination.

21 Claims, 7 Drawing Sheets

METHOD AND SYSTEM FOR COMPENSATING AUDIO SIGNALS DURING A COMMUNICATION SESSION

BACKGROUND INFORMATION

Communications service providers are finding it increasingly challenging to maintain consistent signal quality during a communication session as the variety of communications equipment, networks, and protocols continue to proliferate. For example, it is not uncommon for a modern communication session to be conducted between one user on a traditional landline telephone (e.g., a telephone connected to a public switched telephone network (PSTN)) and another user on personal computer hosting a voice over Internet Protocol (VoIP) session. However, even slight differences in the signal quality between the landline and VoIP connections may make it difficult for the two users to hear each other clearly during the communication session. This problem is especially acute when additional parties participate in a communication session (e.g., in a conference call) where signal quality and other audio problems can multiply accordingly.

Therefore, there is a need for an approach that provides for efficient monitoring and compensation of audio signals during a communication session.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for compensating audio signals during a communication session are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a conferencing system, it is contemplated that these embodiments have applicability to any communication system capable of handling voice communication sessions.

Figure 1:
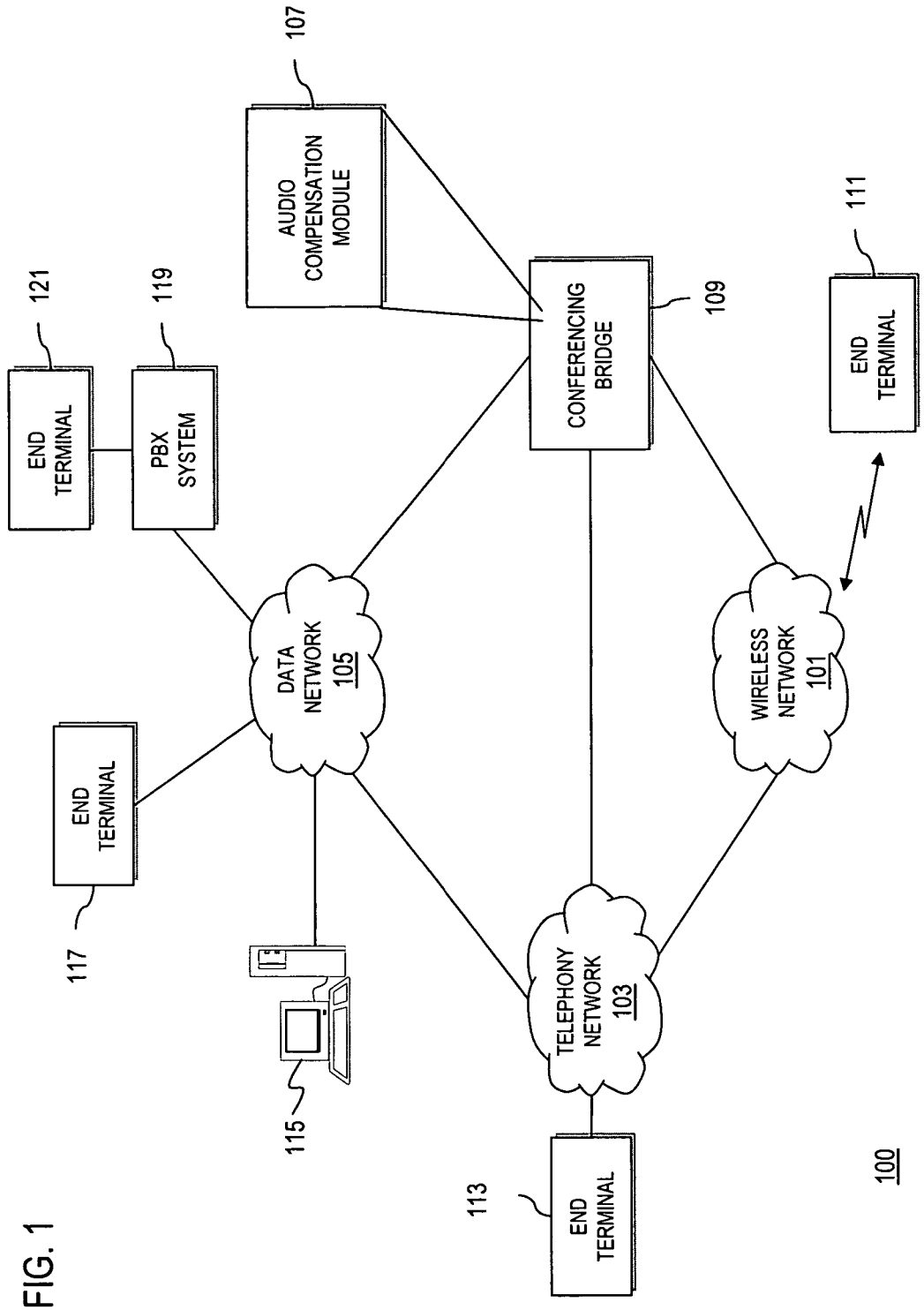
FIG. 1 is a diagram of a system capable of compensating audio signals during a communication session, according to an exemplary embodiment.

FIG. 1 is a diagram of a system capable of compensating audio signals during a communication session, according to an exemplary embodiment. For the purposes of illustration, a mechanism for compensating audio signals is described with respect to voice communications over a communication system 100. In this example, the system 100 includes a wireless network 101, a telephony network 103, and a data network 105. It is contemplated that the wireless network 101 may be, for example, a cellular network and may employ various technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, wireless fidelity (WiFi), satellite, and the like. The telephony network 103 may include a public switched telephone network (PSTN) or equivalent. In addition, it is contemplated that the data network 105 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. These networks 101-105 can support a variety of communications sessions (e.g., voice, video) involving multiple users (e.g., two-party calling, three-way calling, conference calling).

An audio compensation module 107, which, in an exemplary embodiment, can be resident on a conferencing bridge 109, provides the capability to automatically monitor and enhance the audio signals of a communication session (including the audio component of multimedia or video communication sessions), such as those sessions supported by the system 100. Alternatively, the audio compensation module 107 resides anywhere within the network for compensating audio signals during a communication session. In addition (or alternatively), the audio compensation module 107 may reside within customer premises equipment (CPE). In operation, the audio compensation module 107 receives audio signals associated with the parties of a communication session, samples the audio signals to determine a signal level and noise floor for each signal, and compensates the audio signals to bring each signal to approximately an equal level. For example, the module 107 may selectively amplify and/or perform noise cancellation on an audio signal as needed to improve the quality of the signal. Also, the audio compensation module 107 can monitor audio signals during a communication session to enhance the audio signal associated with the party who is currently speaking and to mute the audio signals of participants who are silent. In this way, the module 107 can specifically enhance voice signals while reducing ambient noise introduced by the audio signals of participants who are not speaking.

As discussed, providing consistent signal quality to users during a communication session can be extremely challenging in light of the myriad equipment, networks, and protocols as well as channel conditions involved to conduct a communication session. Traditionally, communication session participants have relied on a number of ad hoc solutions to overcome audio quality problems. For example, a party might be asked to speak more loudly, move closer to the microphone, avoid using certain technologies on a conference call (e.g., avoid using a cell phone), and/or purchase specialized equipment (e.g., directional microphones). The audio compensation module 107 addresses these problems by providing a network-based solution to automatically, in exemplary embodiments, compensate the audio signals of a communication session.

As seen in FIG. 1, the audio compensation module 107 is connected to a conferencing bridge 109 which processes incoming audio signals from parties of a communication session who are using devices connected to the bridge 109. The conferencing bridge 109 then outputs a combined audio signal to conference participants. In exemplary embodiments, conferencing bridge 109 has connectivity to devices and end terminals connected via networks 101-105. For instance, over wireless network 101, conferencing bridge 109 has connectivity to end terminal 111 (e.g. mobile device, handset) via a cellular gateway (not shown). Over telephony network 103, conferencing bridge 109 has connectivity to end terminal 113 (e.g., voice station) via a telephony gateway (not shown). Over data network 105, conferencing bridge 109 has connectivity to a variety of devices supporting voice and multimedia communication sessions (e.g., VoIP sessions) including computing device 115 (e.g., personal computer, laptop) and end terminal 117 (e.g., personal digital assistant (PDA), session initiation protocol (SIP) telephones). Conferencing bridge 109 may also be connected to a private branch exchange (PBX) 119 system via an enterprise gateway (not shown) supporting an end terminal 121 (e.g., PBX telephone).

In certain embodiments, the audio compensation module 107 may have direct connection to the system 100 networks and devices via data network 105. Accordingly, audio compensation module 107 may be configured to work in tandem with conferencing bridge 109 or independently of conferencing bridge 109. For example, the audio compensation module 107 may work independently when a communication session does not require use of conferencing bridge 109 (e.g., two-party calling, three-way calling). In this case, audio signals may be routed from the communication parties directly to the audio compensation module 107, thereby bypassing the conferencing bridge 109. When a communication involves multi-party conference calling, the audio compensation module 107 may work in tandem with conferencing bridge 109. In this case, the conferencing bridge 109 relays the audio streams to the audio compensation module 107 for processing.

In exemplary embodiments, conferencing bridge 109 supports conferencing of parties connected via both a circuit-switched call (e.g., PSTN) and a packet-switched call (e.g., VoIP). In other embodiments, the conferencing bridge 109 may include two separate conferencing bridges, one bridge for supporting circuit-switched calls and another bridge supporting packet-switched calls. Under either scenario, system 100 and, by extension, audio compensation module 107 supports conferencing a mixture of parties who are using traditional telephony (e.g., circuit-switched calls) and parties who are employing packet-switched calls. For example, one or more end terminals 117 (e.g., SIP telephones) may participate in a conference with one or more end terminals 113 (e.g., PSTN telephone).

In one embodiment, the audio compensation service is a managed service, whereby a service provider operates the audio compensation module 107 to serve one or more subscribers.

Figure 2:
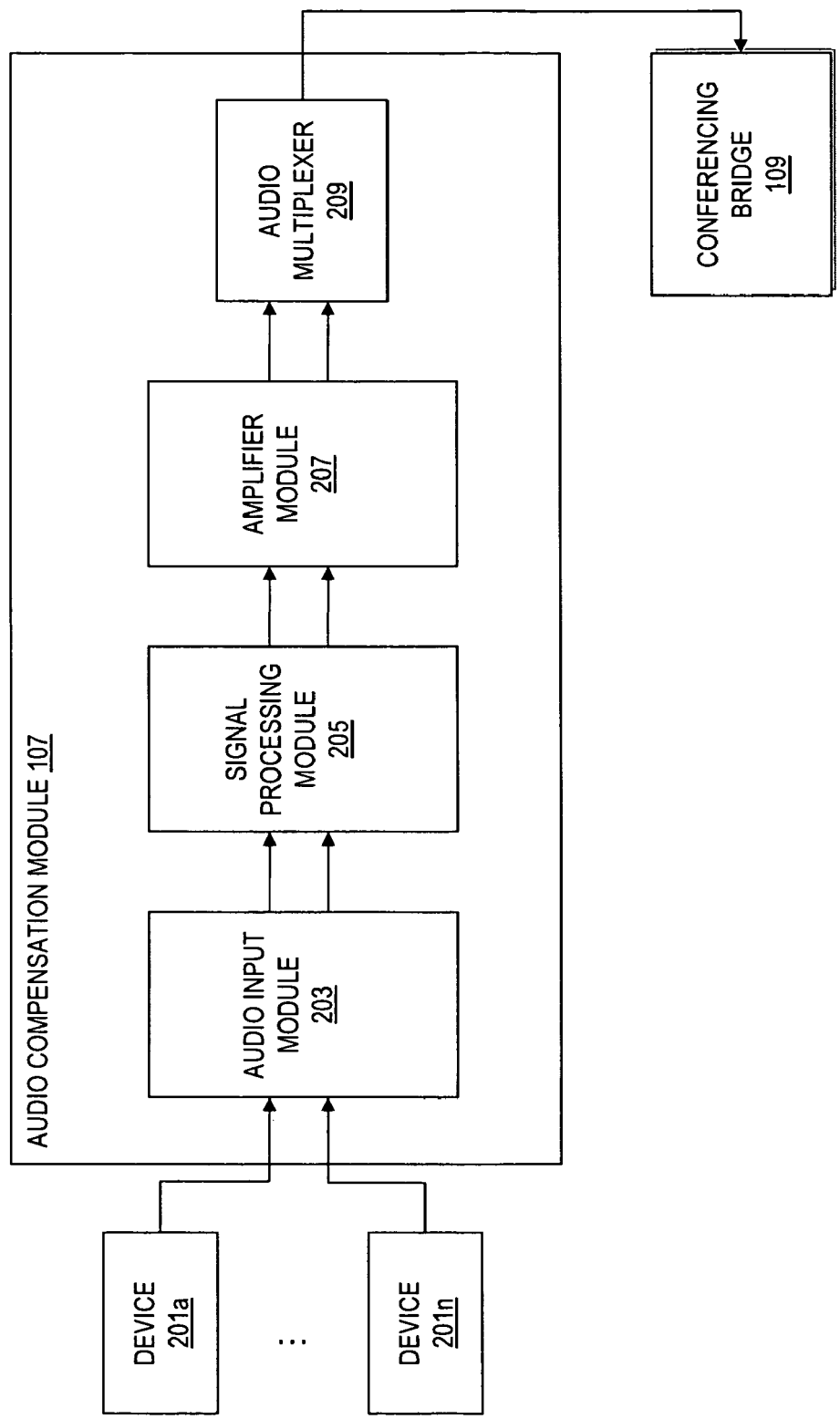
FIG. 2 is a diagram of the components of an audio compensation module, according to an exemplary embodiment.

FIG. 2 is a diagram of the components of an audio compensation module, according to an exemplary embodiment. By way of example, the audio compensation module 107 is separate from the conferencing bridge 109 and includes one or more modules for receiving and processing audio signals. The audio compensation module 107 may also have connectivity to multiple communication devices 201a-201n (e.g., end terminal 111, end terminal 113, computing device 115, end terminal 117, end terminal 121) and the conferencing bridge 109. Within the audio compensation module 107, an audio input module 203 receives audio signals from a plurality of devices 201a-201n participating in a communication session. In exemplary embodiments, the audio input module 203 includes analog-to-digital (A/D) converters to sample the incoming audio streams to digital format for processing by the signal processing module 205. The audio input module 203 maintains each incoming audio signal as a separate stream to facilitate processing.

The signal processing module 205 may then, for example, analyze each incoming audio signal to determine whether to compensate (or adjust) the signal. The module 205 can be configured to measure the signal level and noise floor of each signal as it is received from the audio input module 203 by measuring, for instance, the amplitudes of the signals. In this way, the signal processing module 205 can determine whether any of the incoming signals requires amplification and/or noise cancellation. The module 205 may make this determination by evaluating the amplification and noise cancellation necessary to bring each signal to approximately an equal level while meeting a designated noise threshold. If amplification is necessary, the signal processing module 205 may direct the amplifier module 207 to perform the amplification. If noise cancellation is necessary, the signal processing module 205 may perform the noise cancellation itself. In other embodiments, the audio compensation module 107 may include a separate noise cancellation module to perform this function.

The signal processing module 205 may also perform a spectral analysis of the audio signals to distinguish a voice signal from ambient noise. The spectral analysis may, for example, include quantifying the amounts of various frequencies detected in the audio signal and applying a mathematical transformation (e.g., a Fourier transform) to mathematically represent the signal for identification. The signal processing module 205 can be configured to trigger the muting or unmuting of an audio signal based on the detection or non-detection of a voice signal by, for instance, directing the amplifier module 207 to decrease or increase the gain for the specific audio signal.

After the signal processing module 205 completes its analysis, the amplifier module 207 performs the amplification of each audio signal as directed by the signal processing module 205 and passes the audio streams to the audio multiplexer 209. In exemplary embodiments, the audio multiplexer 209 combines the individual audio streams into a combined signal for output to the conferencing bridge 109. The conferencing bridge 109 may then distribute the combined audio signal to participants of the communication session.

Although depicted as separate modules, it is contemplated that one or more of the components of the audio compensation module 107 may be combined in whole or in part into one component. For example a digital signal processor (DSP) may perform the functions of the modules 203-209. It is also contemplated that one or more of the functions of the audio compensation module 107 may be contained or performed within the conferencing bridge 109.

Figure 3:
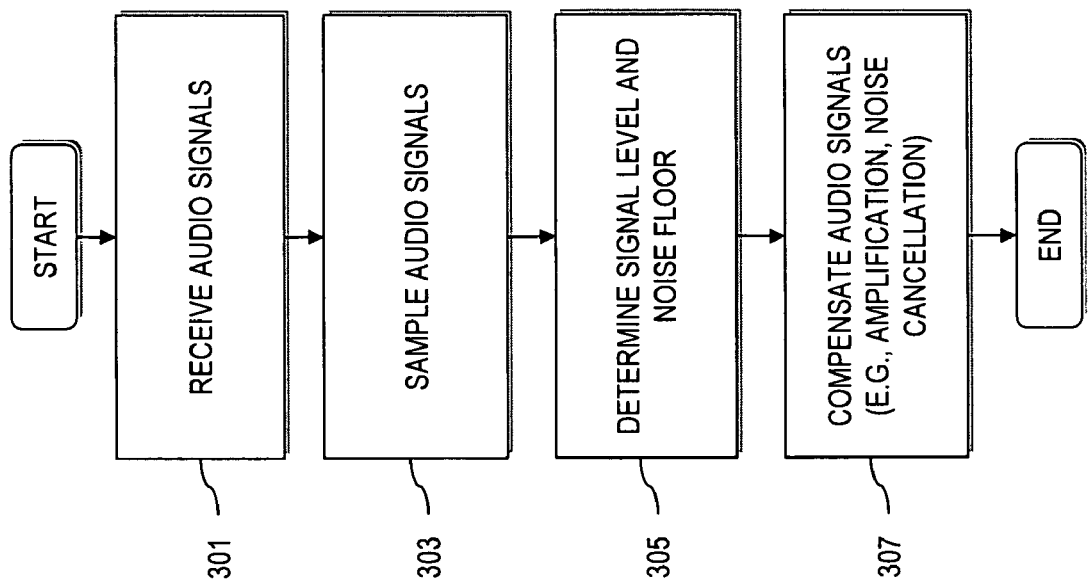
FIG. 3 is a flowchart of a process for compensating audio signals during a communication session, according to an exemplary embodiment.

FIG. 3 is a flowchart of a process for compensating audio signals during a communication session, according to an exemplary embodiment. In step 301, the audio compensation module 107 receives audio signals associated with a plurality of parties of a communication session. In exemplary embodiments, the module 107 may receive audio signals directly from the communication devices involved in the communication session or via the conferencing bridge 109. Moreover, the audio signals may be in either analog or digital format. If the incoming audio signals are analog, the audio input module 203 of the audio compensation module 107 samples the signals to digital format using, for instance, an A/D converter (step 303). If the incoming audio signals are digital and the digital format is compatible with the audio compensation module 107, the audio compensation module 107 bypasses the sampling step. If the digital signal is not compatible, the audio input module 203 converts the digital signal.

Following sampling, the audio compensation module 107 determines the signal level and noise floor for each audio signal. For example, the signal processing module 205 of audio compensation module 107 may measure the amplitude of the signal and noise in each audio signal (step 305). These measurements will assist the audio compensation module 107 in determining the appropriate amount of compensation necessary to bring each audio signal to an approximately equal level in terms of signal level and noise floor (step 307). This compensation can be accomplished by the module 107 through, for example, a combination of amplification and/or noise cancellation.

In exemplary embodiments, the audio compensation module 107 may be configured to compensate the audio signals based on various criteria. For example, the module 107 may compensate each audio signal to approximately match the highest signal level and the lowest noise floor of all of the audio signals. The module 107 also may compensate each audio signal to approximately match the average of signal levels and noise floors of all of the audio signals. It is contemplated that other similar criteria may be used. Additionally, exemplary embodiments of the audio compensation module 107 are configured to amplify any particular audio signal only if the associated speaker is talking.

It is recognized that audio signal quality may be affected by the equipment, networks, and protocols used, as well as environmental conditions or user operation condition. For example, a participant's audio signal quality be degraded (i.e., low signal level and/or high noise) by initiating a call in a noisy environment. In another example, one of the parties may be a "low talker" (i.e., someone who normally speaks at a low volume). Regardless of the cause of the poor signal quality, the audio compensation module 107 will process the audio signal and compensate the signal as necessary.

Figure 4A:
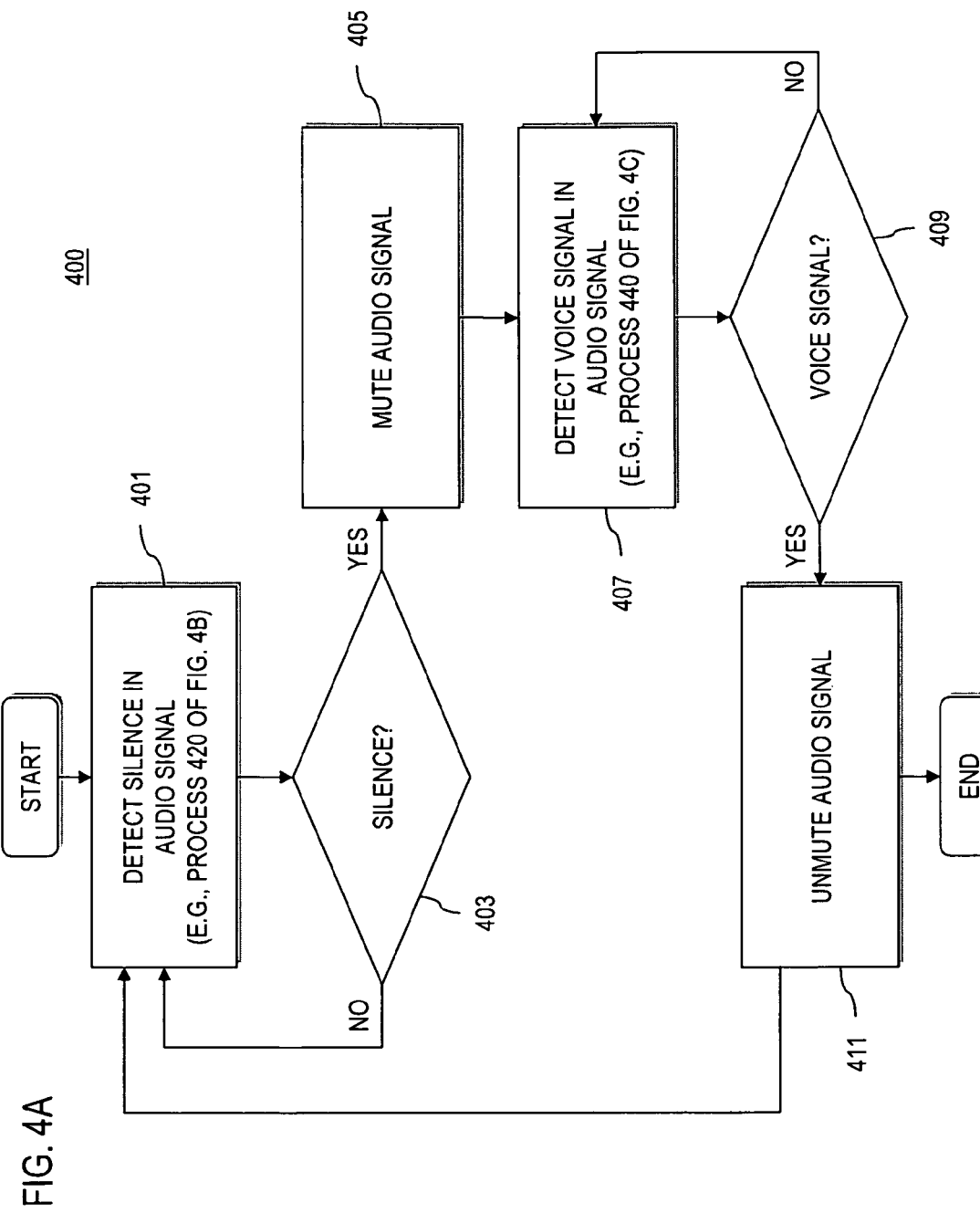
FIGS. 4A-4C, respectively, are a flowchart of a process for minimizing noise from an audio signal by muting the signal during periods silence, a flowchart of a process for detecting silence in an audio signal, and a flowchart of a process for detecting a voice signal in an audio signal, according to various embodiments.

In addition to compensating audio signals, the audio compensation module 107 may be configured to reduce noise during a communication session by automatically muting an audio signal associated with a party who is silent or not speaking. FIG. 4A is a flowchart of a process for minimizing noise from an audio signal during periods of silence, according to an exemplary embodiment. The process 400 of FIG. 4A is described with respect to FIG. 4B which describes an exemplary process 420 for detecting silence in an audio signal. FIG. 4C depicts an exemplary process 440 for detecting a voice signal in an audio signal. As shown in FIG. 4A, in step 401, the audio compensation module 107 monitors each audio signal of a communication session to detect periods of silence in the signal. In exemplary embodiments, the process of detecting silence may be performed using the process 420 of FIG. 4B. It is contemplated that other equivalent processes for detecting silence in an audio stream may be used.

Figure 4B:
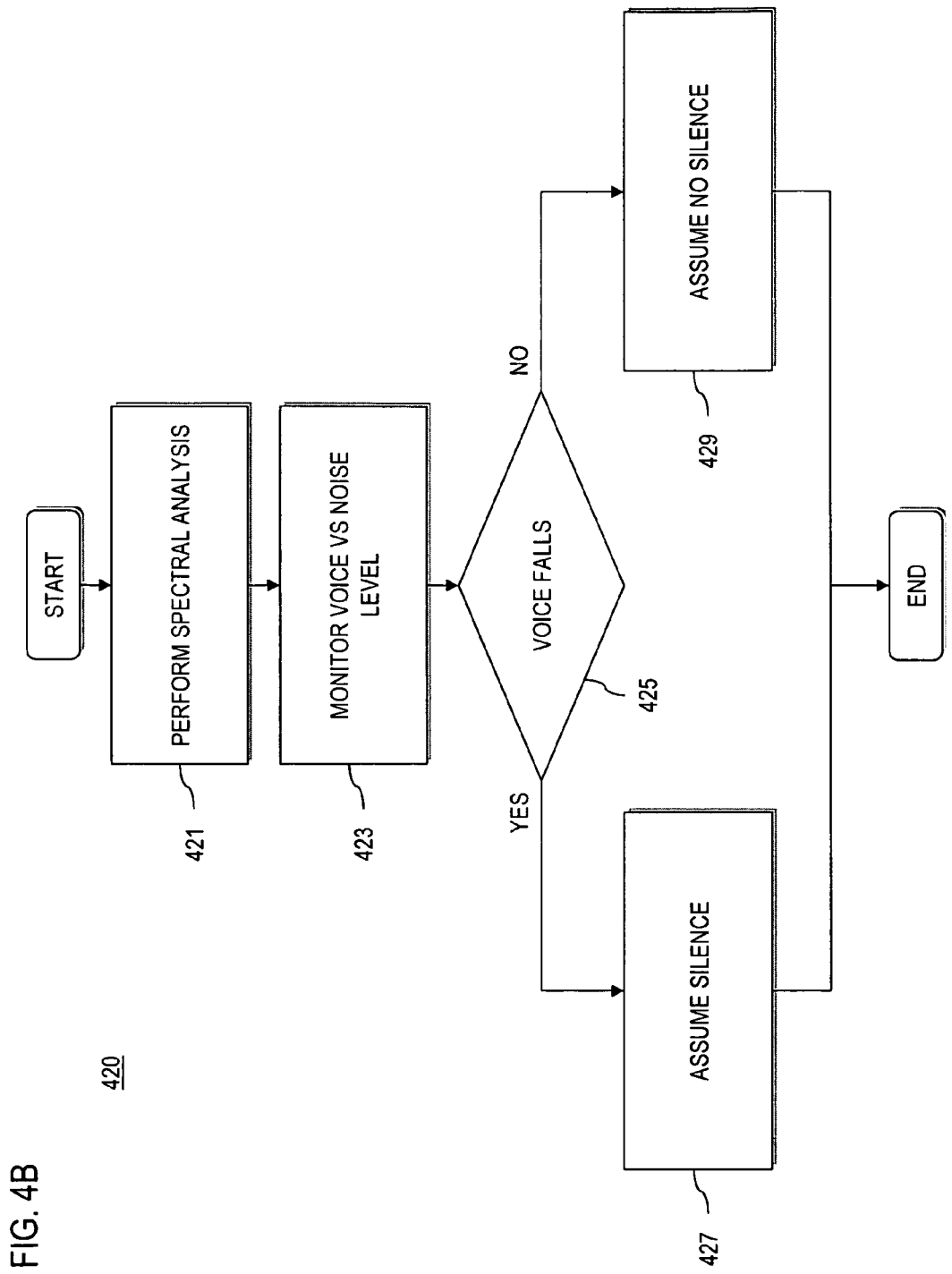
Figure 4C:
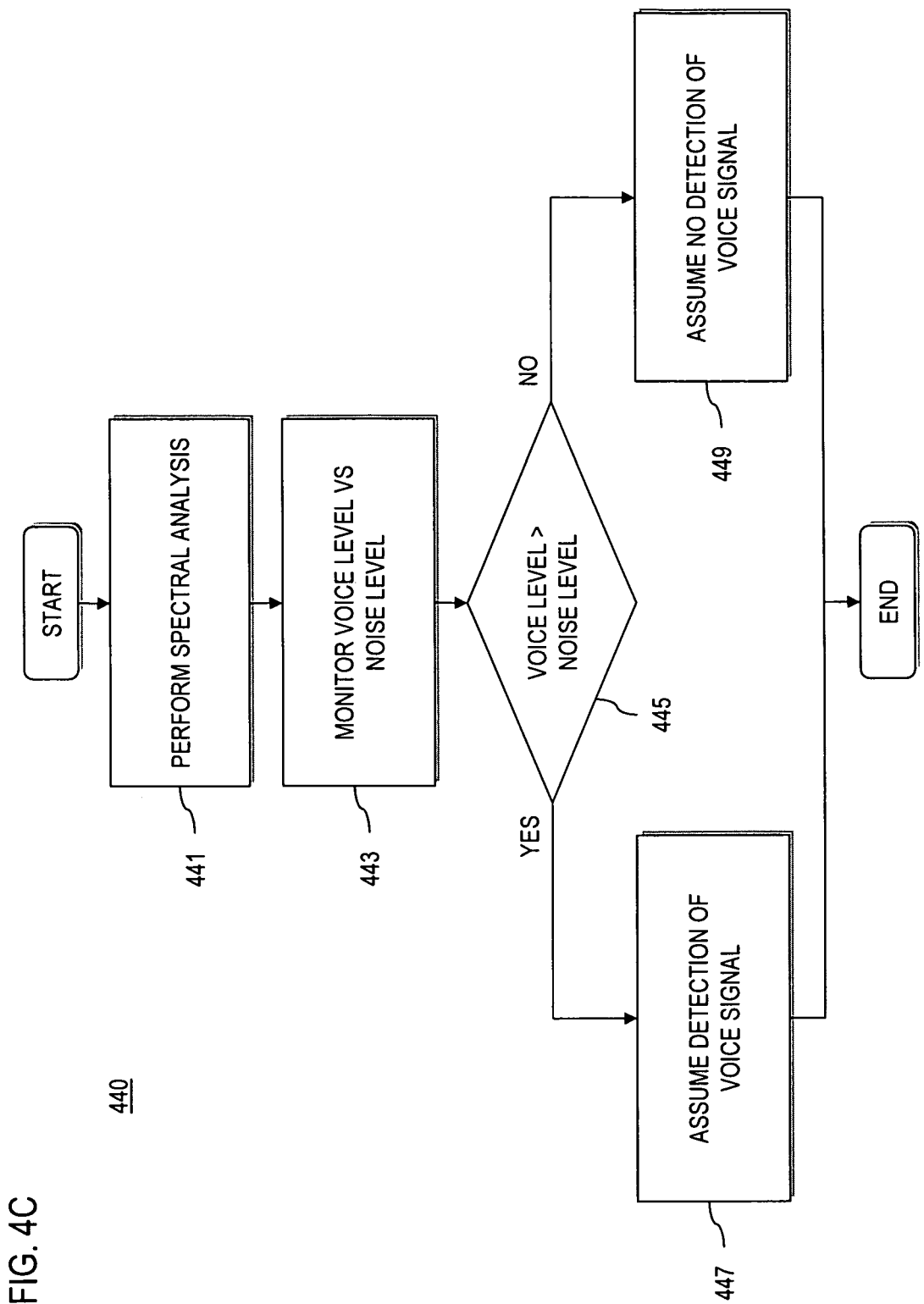

In step 421 of FIG. 4B, the audio compensation module 107 performs a spectral analysis on each audio signal to distinguish a voice signal from the noise floor. The module 107 conducts the spectral analysis continuously and monitors the amplitude of voice signal level in relation to the noise floor (step 423). If the voice signal level falls to approximately the level of the noise floor (step 425), the audio compensation module 107 may, for instance, assume that there is a period of silence (step 427). If the voice signal level remains above approximately the level of the noise floor, then the audio compensation module may assume there is no silence (step 429).

Returning to step 403 of FIG. 4A, the audio compensation module 107 evaluates the outcome of silence detection process. If silence is not detected, the module 107 returns to step 401 and continues to monitor for silence during the communication session. If silence is detected, the audio compensation module 107 mutes the audio signal associated with the detected silence (step 405). In this way, the audio compensation module 107 can reduce the noise contributed by an audio signal associated with party who is silent or not speaking. The module 107 then begins monitoring the muted audio signal to detect a voice signal (step 407). In exemplary embodiments, the process of detecting a voice signal may be performed using the process 440 of FIG. 4C. It is contemplated that other equivalent processes for detecting a voice signal in an audio stream may be used.

The process 440 for detecting a voice signal is similar to the process 420 for detecting silence. In step 441 of FIG. 4C, the audio compensation module 107 performs a spectral analysis on the muted audio signal to distinguish a voice signal from the noise floor. The module 107 conducts the spectral analysis continuously and monitors the amplitude of voice signal level in relation to the noise floor (step 443). If the voice signal increases above approximately the level of the noise floor (step 445), the audio compensation module 107 may, for instance, assume the detection of a voice signal (step 447). If the voice signal level remains at approximately the level of the noise floor, then the audio compensation module may assume the party associated with the muted audio signal has not resumed speaking (step 449).

Returning to step 409 of FIG. 4A, the audio compensation module 107 evaluates the outcome of voice signal detection process for the muted audio signal. If a voice signal is not detected, the module 107 returns to step 407 and continues to monitor for a voice signal during the communication session. If a voice signal is detected, the audio compensation module 107 unmutes the audio signal (step 411). The module 107 then returns to step 401 and resumes monitoring for silence until the communication session ends.

The processes described herein for compensating audio signals during a communication session may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
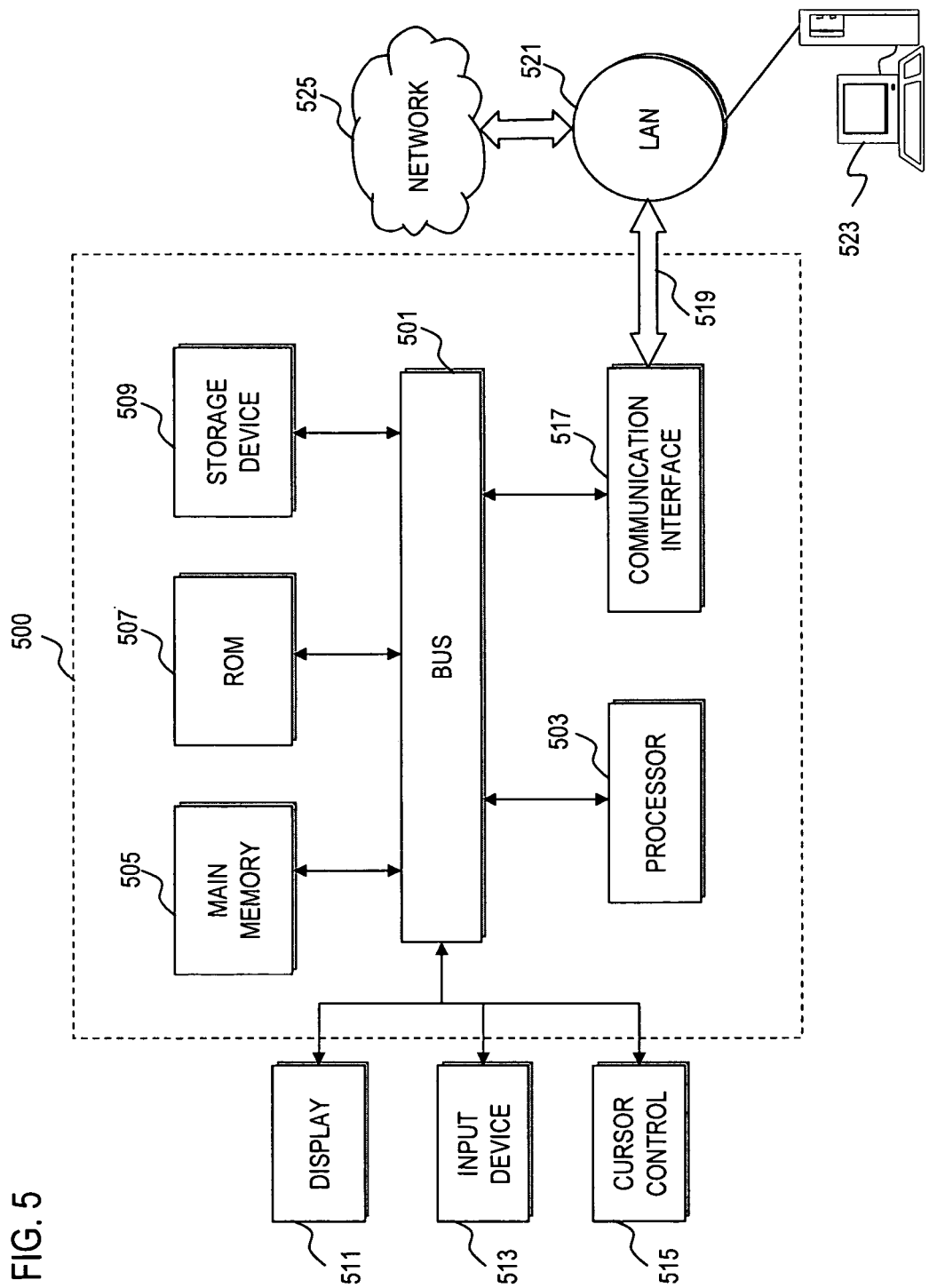
FIG. 5 is a diagram of a computer system that can be used to implement various exemplary embodiments.

FIG. 5 illustrates computing hardware (e.g., computer system) upon which an embodiment according to the invention can be implemented. The computer system 500 includes a bus 501 or other communication mechanism for communicating information and a processor 503 coupled to the bus 501 for processing information. The computer system 500 also includes main memory 505, such as random access memory (RAM) or other dynamic storage device, coupled to the bus 501 for storing information and instructions to be executed by the processor 503. Main memory 505 also can be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving audio signals associated with a plurality of parties of a communication session;

sampling the audio signals to determine a signal level and noise floor for each signal; and compensating the audio signals to bring each signal to substantially an equal level based on the determination.

2. A method of claim 1, wherein an audio signal is compensated when a party associated with the audio signal is speaking.

3. A method of claim 1, wherein the step of compensating the audio signals includes amplifying one or more of the audio signal levels, performing noise cancellation, or both.

4. A method of claim 1, further comprising:
detecting a period of silence in one or more of the audio signals; and
automatically muting an audio signal when silence is detected in the audio signal.

5. A method of claim 4, wherein silence is detected by performing a spectral analysis of each audio signal to distinguish a voice signal from the noise floor, monitoring the amplitude of the voice signal in relation to the noise floor, and assuming silence when the amplitude of the voice signal falls to substantially a level of the noise floor.

6. A method of claim 4, further comprising:
detecting a voice signal in one or more muted audio signals; and
automatically unmuting an audio signal when a voice signal is detected in the audio signal.

7. A method of claim 6, wherein a voice signal is detected by performing a spectral analysis of each audio signal to distinguish the voice signal from the noise floor, monitoring the amplitude of the voice signal in relation to the noise floor, and assuming detection of a voice signal when the amplitude of the voice signal increases above substantially a level of the noise floor.

8. A method of claim 1, wherein the communication session includes a circuit-switched call or a packet-switched call.

9. A method of claim 1, wherein the communication session is a conference call.

10. An apparatus comprising:
an audio input module configured to receive audio signals associated with a plurality of parties of a communication session;
a signal processing module configured to sample the audio signals to determine a signal level and noise floor for each signal; and
an amplifier module configured to compensate the audio signals to bring each signal to substantially an equal level based on the determination.

11. An apparatus of claim 10, wherein an audio signal is compensated when a party associated with the audio signal is speaking.

12. An apparatus of claim 10, wherein the step of compensating the audio signals includes amplifying one or more of the audio signal levels, performing noise cancellation, or both.

13. An apparatus of claim 10, further comprising:
a signal processing module further configured to detect a period of silence in one or more of the audio signals; and
an amplifier module further configured to automatically mute an audio signal when silence is detected in the audio signal.

14. An apparatus of claim 13, wherein silence is detected by performing a spectral analysis of each audio signal to distinguish a voice signal from the noise floor, monitoring the amplitude of the voice signal in relation to the noise floor, and assuming silence when the amplitude of the voice signal falls to substantially a level of the noise floor.

15. An apparatus of claim 13, further comprising:
a signal processing module further configured to detect a voice signal in one or more muted audio signals; and
an amplifier module configured to automatically unmute an audio signal when a voice signal is detected in the audio signal.

16. An apparatus of claim 15, wherein a voice signal is detected by performing a spectral analysis of each audio signal to distinguish the voice signal from the noise floor, monitoring the amplitude of the voice signal in relation to the noise floor, and assuming detection of a voice signal when the amplitude of the voice signal increases above substantially a level of the noise floor.

17. An apparatus of claim 10, wherein the communication session includes a circuit-switched call or a packet-switched call.

18. An apparatus of claim 10, wherein the communication session is a conference call.

19. A system comprising: an audio compensation module configured to compensate audio signals associated with a plurality of parties of a communication session to bring each of the audio signals to substantially an equal level based on a determination of a signal level and a noise floor for each of the audio signals, wherein the communication session includes a plurality of communication devices configured to support communications over one or more networks.

20. A system of claim 19, wherein the communication session includes a circuit-switched call or a packet-switched call.

21. A system of claim 19, wherein the communication session is a conference call.

\* \* \* \* \*